Aug. 16, 1949.　　　A. S. RICHARDSON　　　2,479,408
MINE VENTILATION
Filed March 18, 1944　　　　　　　　　　　2 Sheets—Sheet 2
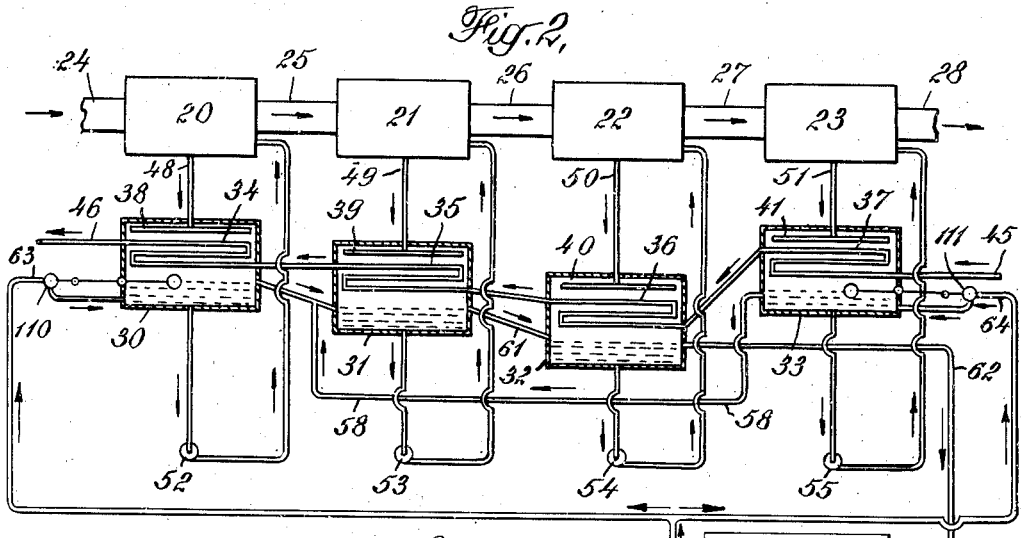
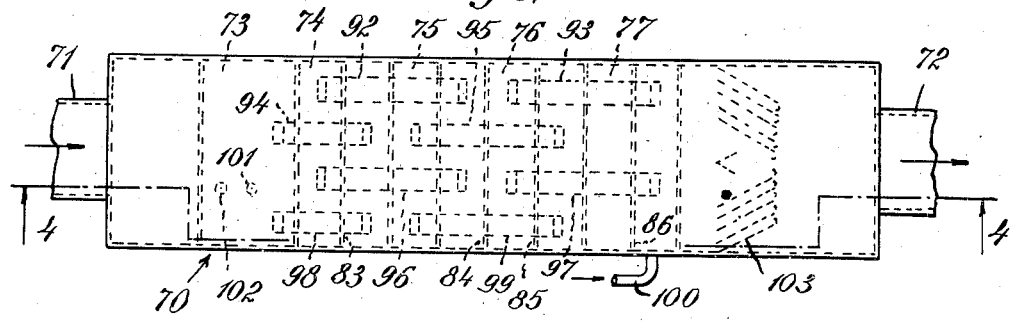
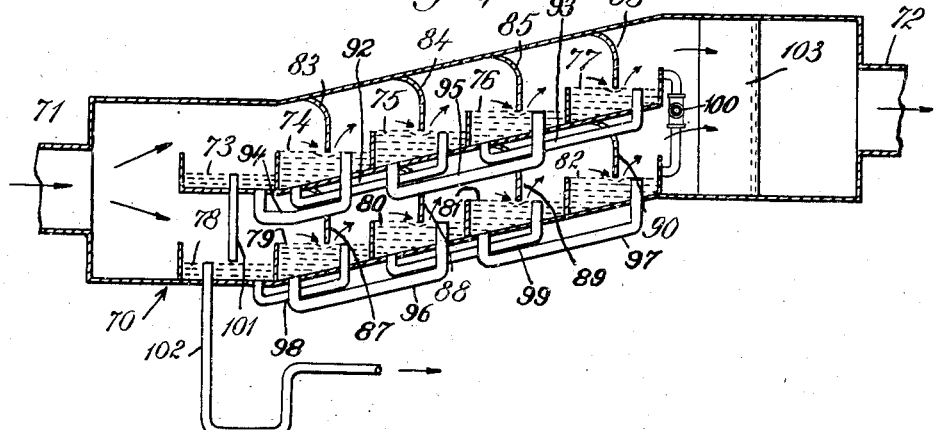
INVENTOR
Allan S. Richardson
BY
Pennie, Davis, Marvin & Edmonds
ATTORNEYS Patented Aug. 16, 1949

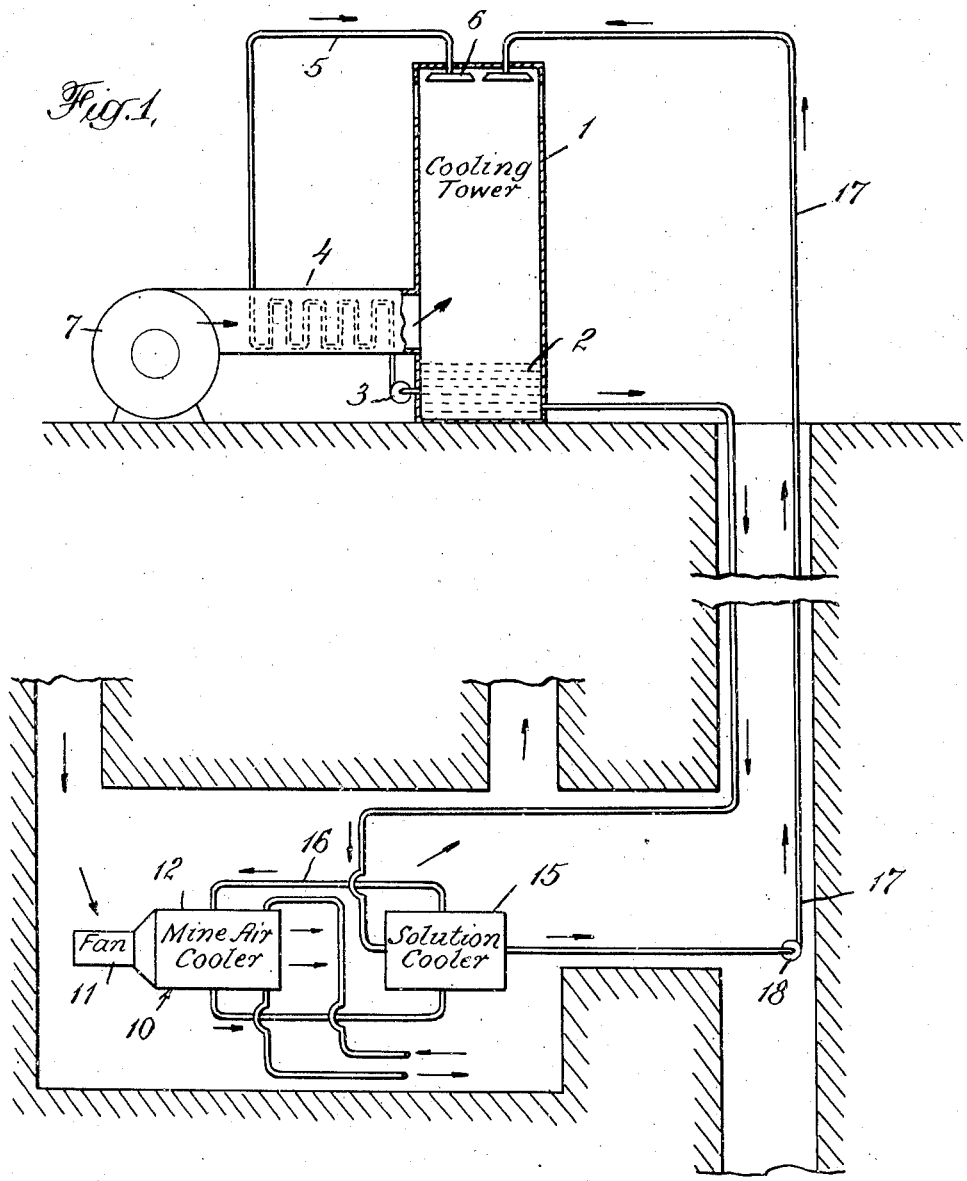

2,479,408

UNITED STATES PATENT OFFICE 2,479,408

MINE VENTILATION

Allan S. Richardson, Butte, Mont.

Application March 18, 1944, Serial No. 527,125

9 Claims. (Cl. 183—120)

This invention relates to cooling warm humid air by dehydration and has for its object the provision of an improved method and apparatus for this purpose. The invention provides an improved method of cooling warm humid mine air by absorption of the water vapor in a hygroscopic liquid, with an accompanying transfer of heat to the liquid, a transfer of heat from the liquid to any suitable place outside the mine, and a regeneration of the liquid by removal of absorbed water therefrom. One of the important aspects of the invention is the utilization of the latent heat of condensation of moisture to increase the temperature of the hygroscopic liquid greatly above the temperature and wet-bulb temperature of the warm humid mine air. This permits the heat withdrawn from the humid mine air to be dissipated, for example, by transference to a circulating fluid at much higher temperatures than would otherwise be possible. The circulating fluid may conveniently be used to carry the heat out of the mine, for example to the surface atmosphere.

The method of the invention comprises absorbing of water vapor from the air by a hygroscopic liquid with a resulting heating of the liquid, transferring heat from the liquid by flowing a cooling medium, such as water, in heat exchange contact therewith, the dissipation of heat from the cooling medium outside the mine, for example, to the surface atmosphere, and the regeneration of the dilute hygroscopic liquid by removal of water therefrom, as by evaporation or freezing, in a cyclic operation. Any suitable hygroscopic liquid may be used, such as salt solutions, for example aqueous solutions of calcium, zinc and lithium chlorides, or solutions of diethylene glycol, and the like.

The absorption of water vapor from the humid mine air liberates the latent heat of evaporation or condensation, which heat is imparted mainly to the hygroscopic liquid, and means are provided to remove the heat from the liquid. Absorption of water vapor from the warm moist air causes the hygroscopic liquid to become dilute, thus lowering its power to absorb vapor from the air, and the invention provides means of removing the absorbed vapor from the hygroscopic liquid.

The transference of vapor from the air to the hygroscopic liquid depends upon the difference between the pressure of the water vapor in the air and the water vapor pressure of the hygroscopic liquid. The pressure of the vapor carried by the air varies approximately as the quantity of water carried per unit volume. The vapor pressure of a hygroscopic salt solution, for example, decreases with increase in the quantity of salt carried per unit volume, or the degree of concentration, and increases very markedly with increase in temperature. The capacity of a salt solution of a given concentration to absorb water vapor from the air is sharply limited to a narrow temperature range by the effect of increase of vapor pressure with increase in temperature.

For economy in the quantity of cooling water required to remove heat from the hygroscopic liquid, it is necessary that the liquid be heated to as high a temperature as permissible, or that it be heated through as wide a temperature range as permissible.

For economy in the quantity of hygroscopic liquid sent to the regeneration process for removing the excess water, it is advantageous that hygroscopic liquid withdrawn from the absorption stage be as dilute as possible, or that the quantity of water removed from the air per unit volume of concentrated hygroscopic liquid delivered to the absorption stage be as large as possible.

In carrying out a method of the invention, I find it advantageous to remove the vapor from the moist warm mine air by contacting the air with the hygroscopic liquid in a number of separate absorption stages, each having a separate body of liquid, in which liquids at different degrees of concentrations and different temperatures are used. It is preferred to contact the moist air with the hygroscopic liquid in the mine, and as close as possible to the place of active working. The air is advantageously passed into contact with the bodies of liquid in series. The incoming air with its initial maximum vapor content and vapor pressure flows in contact with the bodies of liquid of progressively decreasing vapor pressure, the decrease in vapor pressure of the air being countercurrent to the increase in vapor pressure of the liquid. In an operation employing, for example, four separate bodies of hygroscopic salt solution, the air which leaves the drying and cooling stages after contacting the last body of hygroscopic solution has the lowest water content and the lowest vapor pressure.

The method includes the use of intermediate bodies of hygroscopic liquid to reduce the quantity of vapor in the air discharged from the first body of solution to a minimum amount before it contacts the last body of liquid. In an important aspect of the invention, these intermediate bodies of hygroscopic liquid are used to effect maximum dilution of the hygroscopic liquid before it is subjected to regeneration to remove water and increase the concentration.

In an advantageous embodiment of the invention, a series of separate moisture absorption stages are employed, with the cooling water which contacts and absorbs heat from the hygroscopic liquid moving in countercurrent relation to the movement of air through the series of stages, the cooling liquid initially contacting the hygroscopic liquid of the last stage and the warmest cooling liquid finally contacting the hygroscopic liquid of the first stage. The regenerated and concentrated liquid is preferably introduced into the first and last stages, then passed through the second stage to the third stage from which it is withdrawn and regenerated by the removal of water.

The invention provides for control of the temperature of the bodies of hygroscopic liquids largely to maintain the temperatures of the initial and final bodies within desirable limits to effect the most efficient removal of the vapor and heat from the air, and to transmit the heat to the cooling fluid, usually water, so that it will result in the temperature of the cooling water being increased, as it passes successively into contact with the bodies of liquid, by the number of degrees necessary to secure the highest final temperature of the cooling water leaving the system.

The invention provides apparatus for cooling humid mine air comprising a series of contactors in which the hygroscopic liquid contacts the warm moist mine air, the wet-bulb temperature and vapor content of the air being decreased in passing in contact with the separate bodies of hygroscopic liquid in the contactors, means for circulating a fluid, such as water, in heat exchange contact with the hygroscopic liquid to remove heat therefrom, and means for removing water from the dilute hygroscopic liquid to increase its concentration and regenerate it for reuse in the process.

These and other novel features of the invention will be better understood after considering the following description taken in conjunction with the accompanying drawings, in which:

Fig. 1 is a diagrammatic illustration of an arrangement of apparatus for cooling the air in a mine;

Fig. 2 is an elevational view, more or less diagrammatic, of an arrangement of contactors and coolers such as may be used in the apparatus of Fig. 1;

Fig. 3 is an enlarged plan view of one of the contactors of Fig. 2; and

Fig. 4 is a view along the line 4—4 of Fig. 3.

The diagrammatic illustration of apparatus shown in Fig. 1 comprises a cooling tower 1 having a reservoir 2 for the accumulation of water and a pump 3 for circulating the water from the reservoir through the air precooler 4 and up to the top of the tower through the pipe 5 to the distributor 6 from which the water is sprayed into the tower and permitted to fall into the reservoir. Atmospheric air is blown by the fan 7 over the precooler coils and in countercurrent contact with the spray of water in the cooling tower, thereby cooling the water which enters the reservoir 2.

At a place inside the mine, preferably near the active working area, the apparatus 10 for treating the mine air is installed. This apparatus comprises a fan 11 for blowing the warm moist mine air into the mine air cooler 12. The mine air cooler is provided with means for contacting the moist air with a hygroscopic solution, and preferably comprises a plurality of contactors, such as those illustrated in Fig. 2. The solution cooler 15 is advantageously located near the mine air cooler 12 and preferably comprises a plurality of separate interconnected solution coolers such as those shown in Fig. 2. The hygroscopic solution from the contactors is circulated through the pipe 16 in heat exchange contact in the cooler with the water circulated through the pipe 17 and tower 1 by means of the pump 18. It will be apparent that the liquid in the pipe 17 is substantially in hydrostatic balance and the pump 18 has merely to overcome the frictional resistance in the pipe to effect circulation.

A part of the hygroscopic solution circulating through the pipe 16 and contactors is continuously removed and sent to a suitable regenerator for concentration, such as an evaporation pond outside the mine, an evaporator, or a refrigerating unit wherein the water is removed by freezing. The regenerated solution is, of course, returned to the contactors.

An arrangement of contactors and solution coolers suitable for use in an arrangement such as that illustrated in Fig. 1 is shown in Fig. 2 and comprises contactors 20, 21, 22 and 23 arranged in series. The warm humid air is blown by a fan (not shown) into the duct 24 through the contactors and connecting ducts 25, 26 and 27 and out of the discharge port 28 as cool dry air. Each of the contactors, as more fully shown in Figs. 3 and 4, is provided with means for forcing the air into absorbing contact with the solution, and the solution in each contactor is separately circulated through a unit of the solution cooler. Each of the solution coolers 30, 31, 32 and 33 has a cooling coil 34, 35, 36 and 37 and liquid distributors 38, 39, 40 and 41 respectively. The coils are connected in series to the pipe which connects to the cooling tower, the end 45 carrying the incoming cool water from the cooling tower and the end 46 returning the warm water to the cooling tower. The contactors and coolers are each provided with a separate circulating pipe system 48, 49, 50 and 51 and a circulating pump 52, 53, 54 and 55 respectively. The solution flows through these pipes to the distributors 38 to 41 which cause the solution to be spread out and distributed over their respective cooling coils 34 to 37. The cooled solution is circulated by the pumps 52 to 55 back through the contactors.

The overflow solution from the cooler 33 is passed through pipe 58 into the cooler 31 and the overflow solution from cooler 30 is also passed into cooler 31. The dilute solution from cooler 31 flows through pipe 61 into cooler 32 and is removed from cooler 32 by pipe 62 to any suitable regenerator. In the regenerator the excess of water is removed, as by evaporation or freezing, and the concentrated solution is returned to cooler 30 through pipe 63 and to cooler 33 through pipe 64.

The four contactors are identical and one of these is illustrated on an enlarged scale in Figs. 3 and 4. The contactor comprises an enclosure 70 with an open end 71 which connects either to the fan or to one of the other contactors, and an opening 72 which connects either to the discharge outlet or to one of the other contactors, depending upon its position in the series. The contactor comprises a series of adjoining upper tanks or trays 73, 74, 75, 76 and 77 and a series of lower connected tanks or trays 78, 79, 80, 81 and 82. The curved baffles 83, 84, 85, 86, 87, 88, 89 and 90 depend into each of the trays, below the level of liquid therein, and force the moist air to flow in the direction of the arrows and thereby to be effectively contacted by the liquid. The trays are connected below by a number of overflow launders 92, 93, 94, 95, 96, 97, 98 and 99. The solution which is cooled in the coolers and circulated back to the contactors enters the contactor through the feed pipe 100, a part of it flowing into tray 77 and a part into tray 82. The solution flows successively towards the left from tray to tray through the connecting launders, the solution from tray 73 flowing through pipe 101 and joining the solution in tray 78. The combined solution in tray 78 flows through the pipe 102 to one of the coolers. The entrained moisture in the stream of air leaving the last trays passes in contact with a series of baffles or eliminator plates 103 which prevent spray from the solution being blown out of the contactor.

In carrying out an operation in accordance with the invention, it is important to remove the vapor from the air by contacting the hygroscopic solution in a series of contactors in which the solutions in the different contactors are at different degrees of concentrations and at different temperatures. The warm humid air from the mine enters contactor 20. It contacts solution having the highest concentration temperature, and vapor pressure. In absorbing moisture from the air, the solution is accordingly heated to the highest possible temperature. At contactor 23 the air is discharged back into the mine with the lowest vapor content and the lowest vapor pressure. To reduce the quantity of vapor carried by the air leaving final contact as low as possible, it is necessary that the vapor pressure of the hygroscopic solution be as low as possible. That requirement means that the solution must be at its highest degree of concentration and enter the contactor 23 at the lowest possible temperature.

Contactors 21 and 22 are used to reduce the quantity of vapor in the air discharged from contactor 20 to a minimum amount before it enters contactor 23. These intermediate contactors 21 and 22 serve the important function of effecting a maximum dilution of the hygroscopic solution before it passes to the regenerator for the removal of water.

The increase in temperature of the solution passing through each contactor will be controlled to a certain extent by the vapor pressure of the air entering the contactor, but it is also advantageous to regulate the rate of solution flow by means of valves 110 and 111, so as to maintain the initial and final temperatures of the hygroscopic solution within desirable limits.

Initial and final temperatures of solution passing through each contactor should be controlled for two purposes: first, to effect most efficient removal of vapor, or heat, from the air; second, to transmit the heat to the cooling water so that it will result in the temperature of the cooling water being increased at each successive solution cooler by the number of degrees necessary to secure the highest final temperature of the water leaving the plant.

The degree of concentration of hygroscopic solution at contactors 20 and 23 may be controlled by feed valves 110 and 111 which are automatically opened or closed by a hydrometer float. Assuming a 42 per cent solution of calcium chloride to be delivered at the feed valve, the hydrometer float may be set to maintain a 40 per cent solution in the contact circuit.

Dilution of the solution by accumulation of vapor from the air will cause an overflow from contactors 20 and 23 to contactor 21 and from contactor 21 to contactor 22, from which the overflow will pass to the regenerative equipment.

With hydrometer control of the initial and final contactors the adjustment of the plant will be automatic. A decrease in the quantity of vapor entering the plant will reduce the amount of solution supplied to contactor 20, and this, in turn, will reduce the overflow passing to contactors 21 and 22. An increase in the quantity of vapor entering the plant will similarly increase the solution passing to all contactors.

Failure of contactors 20, 21 and 22 to sufficiently reduce the vapor in the air reaching contactor 23 will act to increase the amount of concentrated solution entering the circulation system at that point, and this will also serve to increase the concentration of the solution at contactors 21 and 22. A lowering of the vapor in the air entering contactor 23 will have the reverse effect.

Temperature increase of the cooling water passing through each solution cooler will vary with the temperature of the solution which, in turn, will vary with the quantity of vapor taken out of the air.

I claim:

1. The method of cooling warm humid mine air which comprises passing the warm humid mine air into contact with several separate bodies of hygroscopic solution in series, the bodies of solution being in the mine near the active working area, flowing liquid from the first and last bodies to at least one intermediate body of solution, said intermediate body being relatively dilute, passing the dilute solution from the intermediate body to a regeneration operation for the removal of water and concentration of the solution, returning the concentrated solution to the first and last bodies, and passing a heat absorbing fluid in contact with the bodies of hygroscopic solution to remove heat therefrom and transfer it out of the mine.

2. The method of cooling warm humid mine air which comprises passing the warm humid mine air into contact with several separate bodies of hygroscopic solution in series, the bodies of solution being in the mine near the active working area, flowing liquid from the first and last bodies to at least one intermediate body of solution, said intermediate body being relatively dilute, passing dilute solution from the intermediate body to a regeneration operation for the removal of water and concentration of the solution, returning the concentrated solution to the first and last bodies, pumping cooling water from a source outside the mine in heat exchange contact with the separate bodies of solution to remove heat therefrom and pumping the heated cooling liquid out of the mine to transfer the heat to the atmosphere outside the mine.

3. The method of cooling warm humid mine air which comprises passing the warm humid mine air into contact with several separate bodies of hygroscopic solution in series, the bodies of solution being in the mine near the active working area, flowing liquid from the first and last bodies to at least one intermediate body of solution, said intermediate body being relatively dilute, passing dilute solution from the intermediate body to a regeneration operation for the removal of water and concentration of the solution, returning the concentrated solution to the first and last bodies, circulating solution from each body of solution through a separate cooler, and pumping cooling water from a cooling unit outside the mine through each of the coolers and in heat exchange contact with the solution therein to remove heat therefrom and transfer it to the atmosphere outside the mine.

4. Apparatus for cooling warm humid mine air which comprises a plurality of contactors located in the mine through which the warm moist mine air is blown into moisture absorbing contact with a hygroscopic liquid in the contactors, the contactors including a first contactor wherein the moist mine air makes initial contact and a last contactor wherein the mine air makes final contact, means for circulating a cooling liquid in contact with the hygroscopic liquid, means providing the first and last of the contactors with concentrated hygroscopic liquid and at least one intermediate contactor with dilute hygroscopic liquid, the hygroscopic liquid of the first contactor being heated to a relatively high temperature which provides an efficient transfer of heat to the cooling liquid, and the concentrated hygroscopic liquid of the last contactor cooled by the cooling liquid effectively diminishes the remaining moisture content of the air, a cooler located outside the mine, a pipe system for circulating the cooling liquid through the cooler to dissipate heat therefrom, and means for regenerating the hygroscopic liquid by removing water therefrom.

5. In apparatus according to claim 4, the improvement which comprises a plurality of contactors arranged in series whereby the mine air flows therethrough from one to the other, means for cooling the hygroscopic liquid of each contactor by passing the cooling liquid in counter-current relation to the passage of air whereby the hygroscopic liquid of the last contactor is cooled by the coolest cooling liquid, and a hydrometer controlled valve controlling the return of regenerated hygroscopic liquid to the first and last of the contactors.

6. The method of cooling warm humid air which comprises passing the air through a series of chambers in each of which it is passed countercurrently in contact with a body of hygroscopic liquid to transfer moisture to the liquid and appreciably increase its temperature largely by transfer to it of the heat of condensation of the absorbed moisture, withdrawing portions of the thus-heated hygroscopic liquid separately from each chamber, separately passing the separately withdrawn portions of hygroscopic liquid in countercurrent heat-exchange relation with a cooling fluid at points outside said chambers, and returning the bulk of each separately withdrawn and cooled portion of hygroscopic liquid to the chamber from which it was withdrawn.

7. The method of cooling warm humid air which comprises passing the air through a series of chambers in each of which it is passed countercurrently in contact with a body of hygroscopic liquid to transfer moisture to the liquid and appreciably increase its temperature largely by transfer to it of the heat of condensation of the absorbed moisture, withdrawing portions of the thus-heated hygroscopic liquid separately from each chamber, separately passing the separately withdrawn portions of hygroscopic liquid in counter-current heat-exchange relation with a cooling fluid at points outside said chambers, returning the bulk of each separately withdrawn and cooled portion of hygroscopic liquid to the chamber from which it was withdrawn, advancing the remainder of the solution concurrently with the flow of the air to the next chamber in the series, and passing the cooling fluid in contact with the withdrawn portions of solution countercurrently to the direction in which said remainder of the solution is advanced.

8. The method of cooling warm humid air which comprises passing such air into contact with several separate bodies of hygroscopic liquid in series, the first and last bodies of liquid being of relatively higher concentration than at least one intermediate body, whereby the first body is heated to the maximum practical extent and the last body effects maximum practical dehydration of the air, circulating a cooling fluid in heat-exchange relation with the hygroscopic liquid, and transferring the heat of the fluid to a point outside the space in which the air is being cooled.

9. The method of cooling warm humid air which comprises passing such air into contact with several separate bodies of hygroscopic liquid in series, withdrawing portions of liquid separately from each of said bodies, flowing part of the liquid from each of the portions withdrawn from the first and last of said bodies to at least one relatively dilute withdrawn portion from an intermediate body, passing a cooling fluid in heat-exchange relation with said withdrawn portions of liquid at points outside the place where air is being passed in contact with the liquid, returning the bulk of each withdrawn portion of liquid after cooling to the body from which it was withdrawn, passing liquid from the relatively dilute portion withdrawn from the intermediate body to a regeneration operation for the removal of water and concentration of the liquid, and returning the concentrated liquid to the first and last bodies.

ALLAN S. RICHARDSON.

REFERENCES CITED

The following references are of record in the file of this patent:

UNITED STATES PATENTS

| Number | Name | Date |
| --- | --- | --- |
| 1,878,542 | Richardson | Sept. 20, 1932 |
| 1,909,823 | Forrest et al. | May 16, 1933 |
| 2,017,027 | Forrest | Oct. 8, 1935 |
| 2,062,711 | Stead | Dec. 1, 1936 |
| 2,192,126 | Downs | Feb. 27, 1940 |
| 2,235,004 | Ashley | Mar. 18, 1941 |
| 2,280,633 | Crawford | Apr. 21, 1942 |